(12) United States Patent
Park et al.

(10) Patent No.: US 11,464,091 B2
(45) Date of Patent: Oct. 4, 2022

(54) AC DIRECT LED DRIVER INCLUDING CAPACITOR FOR LED DRIVER

(71) Applicant: POINT TEK CO., LTD., Yongin-si (KR)

(72) Inventors: Shi Hong Park, Seoul (KR); Jun Sik Kim, Yongin-si (KR)

(73) Assignee: POINT TEK CO., LTD., Yongin-Si (KR)

( * ) Notice: Subject to any disclaimer, the term of this patent is extended or adjusted under 35 U.S.C. 154(b) by 0 days.

(21) Appl. No.: 17/332,140

(22) Filed: May 27, 2021

(65) Prior Publication Data

US 2021/0378068 A1    Dec. 2, 2021

(30) Foreign Application Priority Data

May 28, 2020    (KR) .................. 10-2020-0064351

(51) Int. Cl.
*H05B 45/37* (2020.01)
*H02M 7/10* (2006.01)
*H02M 7/04* (2006.01)

(52) U.S. Cl.
CPC .............. *H05B 45/37* (2020.01); *H02M 7/05* (2021.05); *H02M 7/103* (2013.01)

(58) Field of Classification Search
CPC ........ H05B 45/37; H02M 7/05; H02M 7/103; H02M 1/4208; H02M 3/06; H02M 7/062; H02M 7/06
See application file for complete search history.

(56) References Cited

U.S. PATENT DOCUMENTS

2018/0092167 A1*  3/2018  Park ................. H05B 45/46
2019/0132922 A1*  5/2019  Sharifipour .......... H05B 45/37

FOREIGN PATENT DOCUMENTS

| KR | 10 2014 0112985 A | 9/2014 |
| KR | 10 2015 0031880 A | 3/2015 |
| KR | 10 2017 0029999 A | 3/2017 |

* cited by examiner

*Primary Examiner* — Minh D A
(74) *Attorney, Agent, or Firm* — Westman, Champlin & Koehler, P.A.; Amanda M. Prose

(57) ABSTRACT

Disclosed herein is a AC direct LED driving apparatus. The light emitting diode (LED) driving apparatus includes: a rectifier configured to receive and rectify an alternating current (AC) voltage; an LED configured to emit light based on a rectified voltage received from the rectifier; a capacitor connected to a first terminal of the LED, and configured to drive the LED while alternating between charging and discharging sections according to a preset cycle; a first current driver connected to a second terminal of the LED and configured to control a path of current flowing in the LED and the capacitor based on different input voltage levels; a second current driver configured to control charging and discharging of the capacitor; and a first diode connected onto a current path of the capacitor and the second current driver, and configured to form a discharging path for driving the LED based on a charged voltage of the capacitor.

19 Claims, 22 Drawing Sheets

AC DIRECT LED DRIVER INCLUDING CAPACITOR FOR LED DRIVER

CROSS-REFERENCE TO RELATED APPLICATION(S)

This application claims priority to Korean Patent Application No. 10-2020-0064351, filed on May 28, 2020, the disclosure of which is incorporated herein by reference in its entirety.

BACKGROUND

Technical Field

Exemplary embodiments relate to an alternating current (AC) direct light emitting diode (LED) driving apparatus, and more particularly to an AC direct LED driving apparatus including an LED driving capacitor.

Related Art

A light emitting diode (LED) driving apparatus using a converter has disadvantages that a system becomes complicated and it is difficult to reduce the size and weight of the system. Further, a power factor correction circuit is separately needed to improve a power factor, and an additional circuit is required to suppress electromagnetic waves generated at switching, thereby causing a problem of high production costs.

On the other hand, a linear-type LED driving apparatus, to which alternating current (AC) power is directly connected using no separate converters, has a simpler circuit than the converter type and exhibits great characteristics without additional correction circuits prepared for the power factor or the generation of the electromagnetic waves because commercial power, i.e., the AC power is directly used to control electric current. Further, there are advantages of longer life and higher reliability as compared with those of the converter type, in other words, a switching mode power supply (SMPS) type. Further, an AC-direct linear driving method has advantages of good power factor characteristics because current switching occurs in such a manner that a driving current increases as a higher voltage is input.

However, the AC-direct linear driving method, in particular, a sequential driving method exhibits a large current deviation between channels because the LEDs of the channels are sequentially driven according to the levels of the input voltage, in other words, the channels are driven in different driving periods of time and with different driving current levels.

To prevent such a current deviation, there has been proposed a synchronous multi-channel driving method by which the current deviation in time driving is minimized, but the deviation in a driving current level proportional to the input voltage still exists.

Further, the AC-direct driving method has a problem that a flicker occurs as the current is not supplied when the input voltage is lower than the minimum LED voltage drop.

Here, the flicker may refer to that periodic variation in light intensity is visually felt, and there are a percentage flicker and a flicker index as a method of quantifying a degree of flicker. In this case, the percentage flicker is a percentage into which a value obtained by dividing a difference between the highest light quantity and the lowest light quantity by a sum of them is converted, in which the higher the percentage flicker, the worse the flicker characteristics. Meanwhile, the flicker index is a value obtained by dividing light quantity exceeding average light quantity by the average light quantity, and ranges from '0' to '1', in which the lower the flicker index, the better the flicker characteristics.

To improve such a flicker characteristic, there is a need of using a capacitor or inductor which serves as storage of energy for driving an LED while power is not supplied. By connecting the capacitor to an input terminal or connecting the capacitor in parallel to the LED, current based on voltage stored in the capacitor is supplied to the LED while an input voltage is lower than an LED voltage. This method has been used a lot. Meanwhile, the linear driving method, in which AC voltage is directly used without the converter or the capacitor, always exhibits a percentage flicker of 100%, i.e., the worst value.

FIG. 1 illustrates a conventional linear-type LED driving circuit, and FIG. 2 shows voltage $V_{IN}$ and current $I_{IN}$ input over time t in the driving current of FIG. 1.

In FIG. 2, specific figures and units of time t, voltage $V_{IN}$ and current $I_{IN}$ are omitted because rough change thereof is important rather than the specific figures.

As shown in FIGS. 1 and 2, the current does not flow in the LED and therefore the percentage flicker has the highest value of 100% in a section where the input voltage $V_{IN}$ is lower than a turn-on voltage of the LED.

FIG. 3 illustrates a conventional LED driving circuit in which the capacitor is connected to a rectifying terminal, which is an LED driving circuit in which the capacitor is connected to the input terminal in order to decrease the flicker. FIG. 4 is a graph showing input voltage and current characteristics in the circuit of FIG. 3.

As shown therein, a rectifier is supplied with AC voltage from AC power $V_{AC}$, rectifies the supplied voltage, and supplies the rectified voltage to an LED. Such a rectified voltage is charged in the capacitor and used as voltage for driving the LED.

FIG. 4 shows rectified input power $V_{IN}$, current $I_{LED}$ flowing in one LED, and input current $I_{IN}$.

When the input power $V_{IN}$ is charged in the capacitor, a charged voltage lower than the input power is used as a reference voltage and the flow of the input current $I_{IN}$ is controlled based on the reference voltage. As shown therein, in the conventional case, a high charged current $I_{IN}$ is generated for a short charging time.

In the driving apparatus as shown in FIG. 3, when the LED voltage is set to be lower than the rectified input voltage, it is possible to lower the percentage flicker even up to "0%" but there is a problem that an inrush current is high because the capacitor is needed to be charged with high current for a short period of time. Further, due to a very low power factor not higher than '0.6' and a high total harmonic distortion (THD) not lower than 40%, applicability is very limited.

In short, the method shown in FIG. 3, in which voltage rectified through the rectifier by using the capacitor at the input terminal is used for driving the LED has problems that an overcurrent breaker may operate due to the inrush current when many lights are driven in parallel and a high inrush current is continuously generated when a triode AC switch (TRIAC) is used because a high current is generated when power is supplied, even though the flicker characteristics are very improved. Further, the power factor and THD characteristics are bad and thus the use of the method is restricted.

FIG. 5 illustrates another conventional LED driving circuit in which the capacitor is connected to a rectifying terminal, which is an LED driving circuit in which the capacitor is connected in parallel to the LED in order to decrease the flicker. FIG. 6 is a graph showing an input voltage, an input current and an LED current in the circuit of FIG. 5.

The driving circuit of FIG. 5 may be used to solve the problems of the conventional driving method shown in FIG. 3, i.e., the problems of a charging overcurrent and a low power factor. However, as shown in FIG. 6, the voltage stored in the capacitor is equal to the voltage of the LED, and thus there is a disadvantage that the LED current steeply decreases at discharging. Therefore, a capacitor of a higher value is required to exhibit the same flicker characteristic as that of FIG. 3.

Meanwhile, regarding a recent LED light, a move to further strengthen flicker regulations has been actively made. The strengthening of the regulation is based on a research report that a sensitive human may feel dizzy or have a seizure when exposed to light having a high percentage flicker for a long time. In other words, the linear method directly using the AC power is not usable for a general light any more if it does not satisfy the flicker characteristics required in new regulations expected to be enacted in the future, even though the linear method has advantages of high reliability based on simpleness of a system, a lightweight, thin, compact and small system, low production costs, etc. on the contrary to the switching method. Further, the use of the conventional LED driving based on the capacitor as shown in FIG. 3 is very limited due to the problems of an overcharged current and a low power factor.

Accordingly, a LED driving method is required to satisfy new flicker characteristics expected to be further strengthened in the future, have a high efficiency, and have lightweight, thin, compact and small features without using an inductor or transformer.

SUMMARY

Aspects of one or more exemplary embodiments are to provide an alternating current (AC) direct light emitting diode (LED) driving apparatus including an LED driving capacitor improved in flicker characteristics.

Further, aspects of one or more exemplary embodiments are to provide an AC direct LED driving apparatus including an LED driving capacitor, which satisfies high efficiency and high power-factor characteristics and decreases an overcharged current.

Further, aspects of one or more exemplary embodiments are to provide an AC-direct linear LED driving apparatus which satisfies a low total harmonic distortion (THD) characteristic while satisfying a uniform optical characteristic and a high optical efficiency.

Additional aspects will be set forth in part in the description which follows and, in part, will become apparent from the description, or may be learned by practice of the exemplary embodiments.

According to an aspect of an exemplary embodiment, there is provided an LED driving apparatus including: a rectifier configured to receive and rectify an alternating current (AC) voltage; an LED configured to emit light based on a rectified voltage received from the rectifier; a capacitor connected to a first terminal of the LED, and configured to drive the LED while alternating between charging and discharging sections according to a preset cycle; a first current driver connected to a second terminal of the LED and configured to control a path of current flowing in the LED and the capacitor based on different input voltage levels; a second current driver configured to control charging and discharging of the capacitor; and a first diode connected onto a current path of the capacitor and the second current driver, and configured to form a discharging path for driving the LED based on a charged voltage of the capacitor.

In the LED driving apparatus, the first current driver includes: a first metal oxide semiconductor field effect transistor (MOSFET) of which a drain terminal is connected to the second terminal of the LED; and a first resister connected between a source terminal of the first MOSFET and a ground terminal, and the second current driver includes: a second MOSFET of which a drain terminal is connected to the capacitor; and a second resister connected between a source terminal of the second MOSFET and the ground terminal.

In the LED driving apparatus, the first current driver includes: a first MOSFET of which a drain terminal is connected to the second terminal of the LED; and a first resister connected between a source terminal of the first MOSFET and a ground terminal, and the second current driver includes: a second resister connected between the capacitor and the ground terminal.

The LED driving apparatus further includes a second diode configured to prevent current from flowing from the second current driver to the capacitor.

In the LED driving apparatus, the first diode is connected in parallel to the second resister.

In the LED driving apparatus, the first current driver further includes a first cascode device connected in series between the LED and the first MOSFET, and the second current driver further includes a second cascode device connected in series between the capacitor and the second MOSFET.

In the LED driving apparatus, the first current driver further includes a first operational amplifier (OP AMP) of which an output terminal is connected to a gate terminal of the first MOSFET, and the second current driver further includes a second OP AMP of which an output terminal is connected to a gate terminal of the second MOSFET.

In the LED driving apparatus, the first current driver includes: a first MOSFET of which a drain terminal is connected to the second terminal of the LED; and a first resistor connected between a source terminal of the first MOSFET and a ground terminal, and the second current driver includes: a third diode of which an anode is connected to the rectifier and a cathode is connected to the first terminal of the LED; a second MOSFET of which a drain terminal is connected to the capacitor; a third MOSFET of which a drain terminal is connected to the anode of the third diode and which is source-coupled to the second MOSFET; and a second resister connected between a source terminal of the second MOSFET and the ground terminal.

In the LED driving apparatus, the second current driver further includes a third resister connected between the anode of the third diode and the drain terminal of the third MOSFET, and making current flowing in the third MOSFET be proportional to a level of an input voltage.

The LED driving apparatus further includes a second diode configured to prevent current from flowing from the second current driver to the capacitor.

In the LED driving apparatus, the first diode is connected in parallel to the second resister.

In the LED driving apparatus, the first current driver further includes a first cascode device connected in series between the LED and the first MOSFET, and the second current driver further includes: a second cascode device connected in series between the capacitor and the second MOSFET; and a third cascode device connected in series between the anode of the third diode and the third MOSFET.

In the LED driving apparatus, the first current driver further includes a first OP AMP of which an output terminal is connected to the gate terminal of the first MOSFET, and the second current driver further includes: a second OP AMP of which an output terminal is connected to the gate terminal of the second MOSFET; and a third OP AMP of which an output terminal is connected to the gate terminal of the third MOSFET.

In the LED driving apparatus, the first current driver includes: a first MOSFET of which a drain terminal is connected to the second terminal of the LED; and a first resister connected between the source terminal of the first MOSFET and a ground terminal, and the second current driver includes: a third diode of which an anode is connected to the rectifier and a cathode is connected to the first terminal of the LED; a second resister connected between the capacitor and the ground terminal; a third MOSFET of which a drain terminal is connected to the anode of the third diode; a third resister connected between the source terminal of the third MOSFET and the ground terminal; and a comparator configured to compare a predetermined voltage with voltage at opposite terminals of the second resister and control the third MOSFET to be turned on or off.

In the LED driving apparatus, the first current driver includes: a first MOSFET of which a drain terminal is connected to the second terminal of the LED; and a first resister connected between the source terminal of the first MOSFET and a ground terminal, and the second current driver includes: a third diode of which an anode is connected to the rectifier and a cathode is connected to the first terminal of the LED; a second resister connected between the capacitor and the ground terminal; a third MOSFET of which a drain terminal is connected to the anode of the third diode; a third resister connected between the source terminal of the third MOSFET and the ground terminal; and an inverter configured to detect voltage at opposite terminals of the second resister and control the third MOSFET to be turned on or off.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
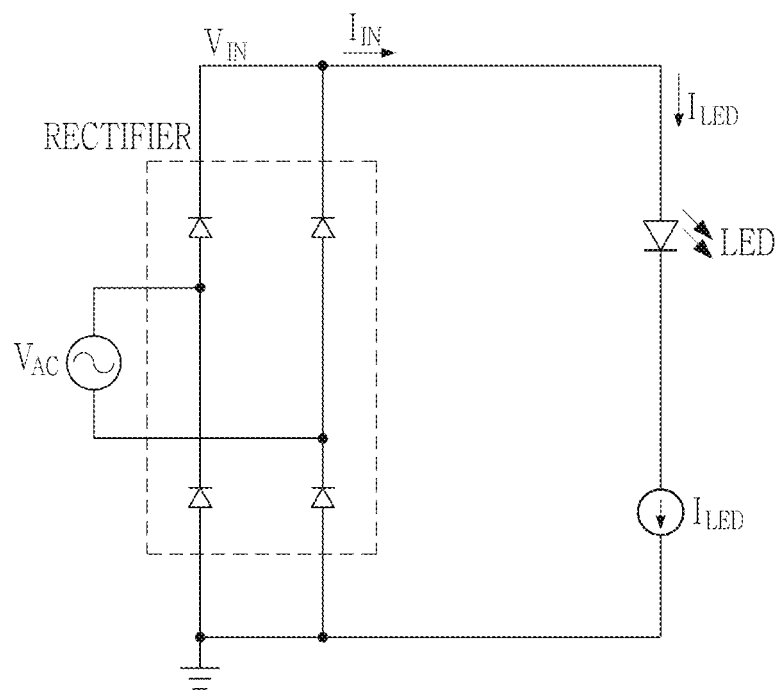
FIG. 1 illustrates a conventional linear-type light emitting diode (LED) driving circuit.
Figure 2:
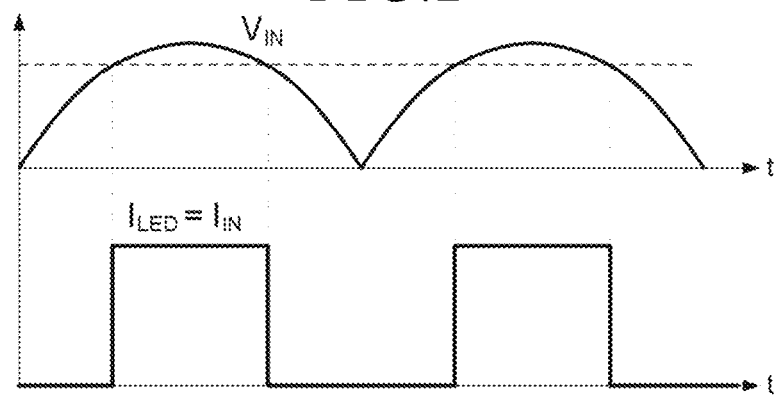
FIG. 2 shows voltage $V_{IN}$ and current $I_{IN}$ input over time tin the driving current of FIG. 1.
Figure 3:
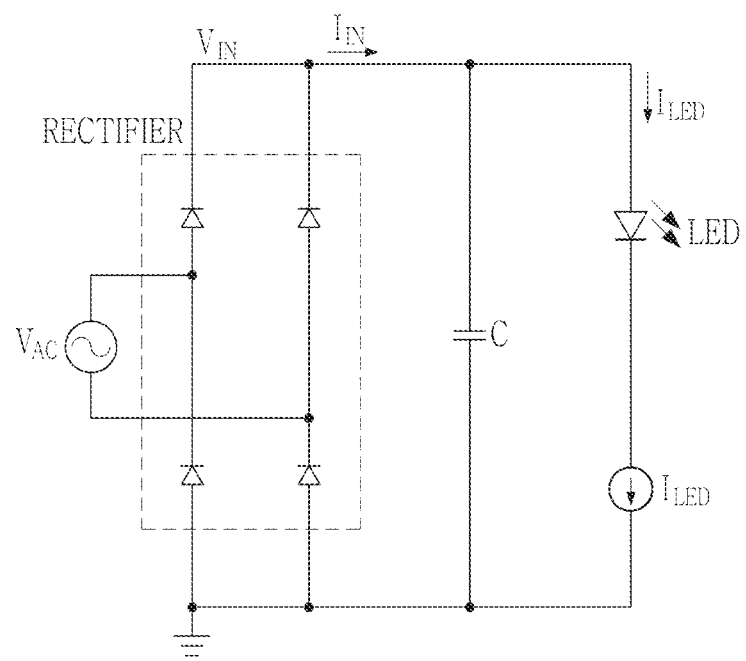
FIG. 3 illustrates a conventional LED driving circuit in which a capacitor is connected to a rectifying terminal.
Figure 4:
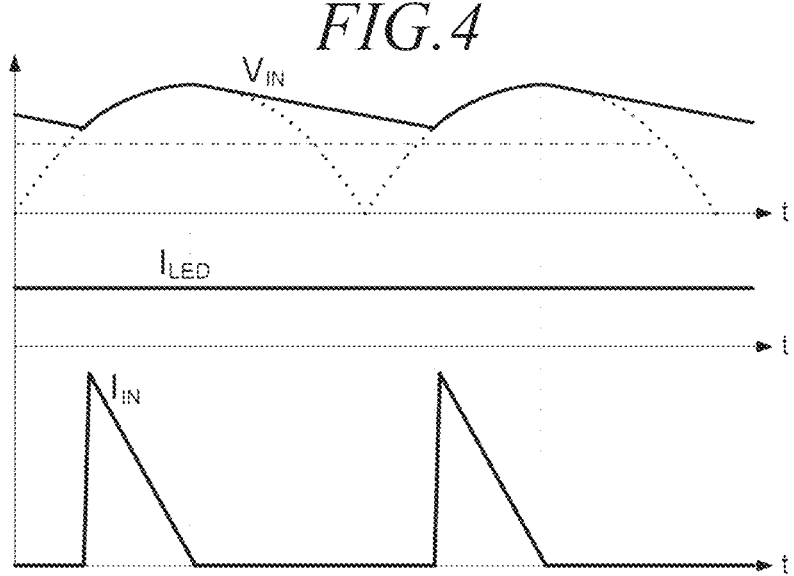
FIG. 4 is a graph showing input voltage and current characteristics in the circuit of FIG. 3.
Figure 5:
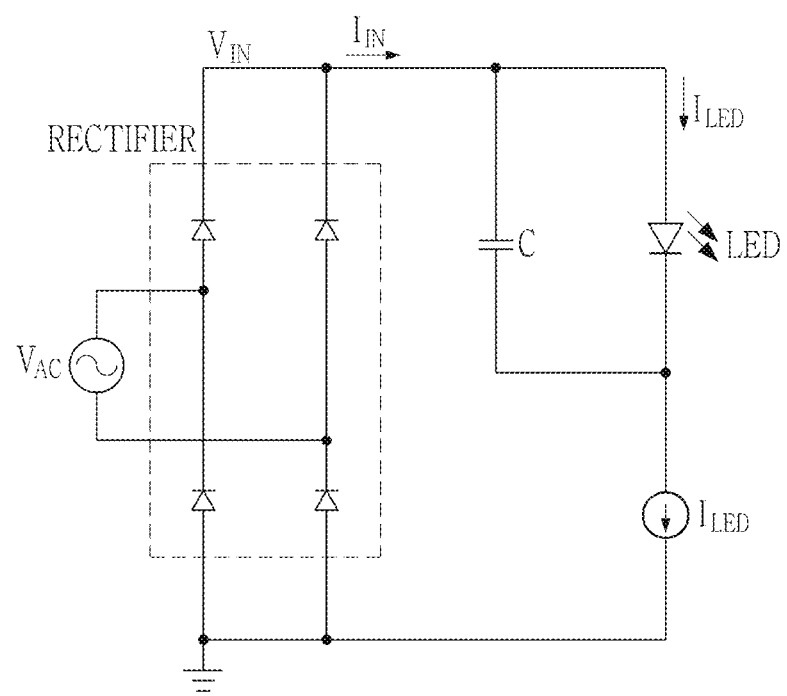
FIG. 5 illustrates another conventional LED driving circuit in which a capacitor is connected to a rectifying terminal.

Below, exemplary embodiments will be described with reference to the accompanying drawings, in order to enable a person having ordinary skill in the art to embody and practice the invention. However, the disclosure is not limited to the exemplary embodiments disclosed below, but can be implemented in various forms. Further, in the drawings, parts unrelated to the descriptions are omitted for clarity, and like numerals refer to like elements throughout.

In the disclosure, repetitive descriptions will be avoided with regard to the same element.

Further It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Further, the terminology used herein is for the purpose of describing particular embodiments only and is not intended to be limiting of the disclosure.

Further, the singular forms are intended to include the plural forms as well, unless the context clearly indicates otherwise.

Further, it will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, the term "and/or" includes any and all combinations of one or more of the associated listed items. In the disclosure, 'A or B' may include 'A', 'B', or 'both A and B'.

Further, in the disclosure, detailed descriptions of relevant publicly-known functions or elements, which may cloud the gist of the disclosure, will be omitted.

Figure 7:
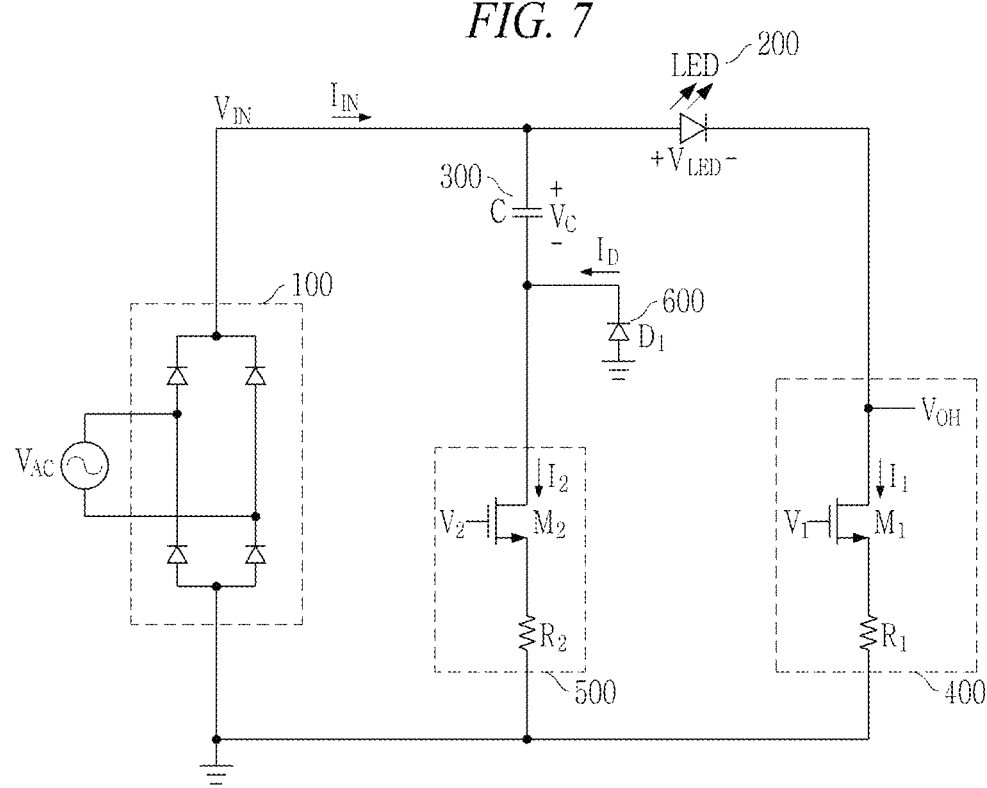
FIG. 7 is a circuit diagram of an alternating current (AC) direct LED driving apparatus including an LED driving capacitor according to an exemplary embodiment.

FIG. 7 is a circuit diagram of an alternating current (AC) direct light emitting diode (LED) driving apparatus including an LED driving capacitor according to an exemplary embodiment.

As shown therein, the LED driving apparatus according to this exemplary embodiment may include a rectifier 100, an LED (LED) 200, a capacitor (C) 300, a first current driver 400, a second current driver 500 and a first diode 600.

The rectifier 100 serves to receive an AC power voltage from AC power (AC), rectify the received voltage, and supply a rectified current to the LED 200. As shown therein, the rectifier 100 may include, but not limited to, a bridge diode, and may be embodied by any circuit as long as it can change current alternating between positive and negative directions into current flowing only in one direction.

The LED 200 emits light by receiving a rectified voltage from the rectifier 100, which may be embodied by a channel to which at least one connected LED is connected. The number of LEDs included in the LED 200 and a connecting method (series or parallel) thereof may be varied depending on the kinds of light to which the driving apparatus will be applied, and the LEDs forming one channel may be simultaneously turned on or off.

The capacitor 300 is connected to a first terminal of the LED 200, and drives the LED 200 while alternating between charging and discharging sections according to a preset cycle. The capacitor 300 drives the LED 200 with voltage charged during a discharging section, and such charging and discharging of the capacitor 300 may be controlled by the second current driver 500.

The first current driver 400 is connected to a second terminal of the LED 200 and controls a path of current flowing in the LED 200 according to different input voltage levels, and the second current driver 500 controls charging and discharging of the capacitor 300. In other words, the first current driver 400 serves to drive the LED 200, and the second current driver 500 serves to charge the capacitor 300.

The first current driver 400 and the second current driver 500 refer to switching devices for controlling the paths of the current flowing in the LED 200 and the capacitor 300, and may include metal oxide semiconductor field effect transistor (MOSFET) $M_1$ and $M_2$, and resisters $R_1$ and $R_2$ connected to the switching device $M_1$ and $M_2$ and a ground terminal and controlling the driving current for the switching devices $M_1$ and $M_2$, respectively.

In other words, as shown in FIG. 1, the first current driver 400 includes a first MOSFET $M_1$ of which a drain terminal is connected to the second terminal of the LED 200, and a first resister $R_1$ connected between a source terminal of the first MOSFET $M_1$ and a ground terminal. The second current driver 500 includes a second MOSFET $M_2$ of which a drain terminal is connected to the capacitor 300, and a second resister $R_2$ connected between a source terminal of the second MOSFET $M_2$ and the ground terminal.

The current $I_{M1}(I_1)$ and $I_{M2}(I_2)$ flowing in the first MOSFET $M_1$ and the second MOSFET $M_2$ may be expressed as follows.

$$I_{M1}=(V_1-V_{GS,M1})/R_1$$

$$I_{M2}=(V_2-V_{GS,M2})/R_2 \quad \text{[Expression 1]}$$

In the expression 1, $V_1$ indicates a gate voltage for turning on the first MOSFET $M_1$, and $V_{GS,M1}$ indicates voltage between the gate and the source of the first MOSFET $M_1$. Further, $V_2$ indicates a gate voltage for turning on the second MOSFET $M_2$, and $V_{GS,M2}$ indicates voltage between the gate and the source of the second MOSFET $M_2$.

The first MOSFET $M_1$ and the second MOSFET $M_2$ may be embodied by switching devices, which do not include an anti-parallel diode between the drain and the source, such as a bipolar junction transistor (BJT) or an insulated gate bipolar transistor (IGBT), as well as the MOSFET.

Further, the LED driving apparatus may further include the first diode 600 which is connected onto a current path of the capacitor 300 and the second current driver 400, and forms a discharging path for driving the LED 200 based on the charged voltage of the capacitor 300.

The first diode 600 provides a discharging path of the capacitor 300, is turned on when an input voltage is lower than voltage stored in the capacitor 300, and provides a current path for allowing the first current driver 400 to drive the LED 200. If the first diode 600 is not present, the current path may be provided through a parasitic diode between the source and drain of the second MOSFET $M_2$ and the second resister $R_2$, but an efficiency at discharging is lowered. Further, when the second MOSFET $M_2$ is an integrated MOSFET, a diode may be formed as a parasitic device, and in this case an internal parasitic diode may replace the first diode 600.

The charging and discharging of the capacitor 300 based on the second current driver 500 and the first diode 600 are as follows.

The voltage of the capacitor 300 is varied depending on the voltage of the LED 200 and the first current driver 400 and the second current driver 500. When the voltage of the capacitor 300 is lower than the voltage of the LED 200, the capacitor 300 is continued to be charged without discharging. When the voltage of the capacitor 300 is higher than the voltage of the LED 200, the capacitor 300 reaches a steady-state condition by alternating between the charging and the discharging. In this case, when the lowest voltage of the capacitor 300 is higher than the voltage of the LED 200, a section where the current of the LED 200 is decreased into "0A" disappears, and a constant current set by the first current driver 400 flows in the LED 200, thereby decreasing a flicker.

Figure 8:
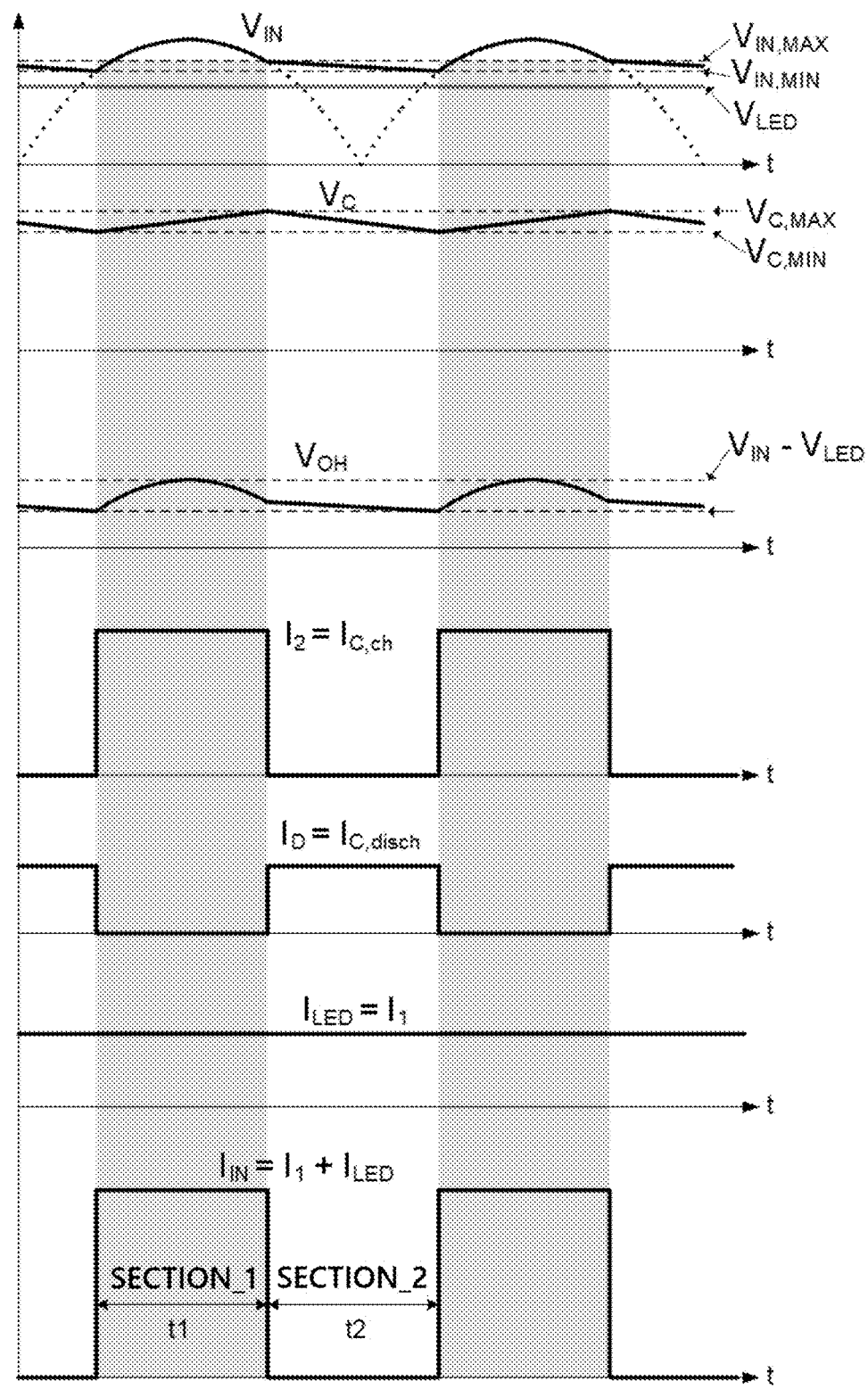
FIG. 8 is a graph showing current flowing in important devices, and voltage at important nodes, such as an input voltage, an input current, a capacitor voltage, current flowing in the LED, etc. of when the circuit of FIG. 7 operates in a steady-state condition.

FIG. 8 is a graph showing current flowing in important devices, and voltage at important nodes, such as an input voltage, an input current, a capacitor voltage, current flowing in the LED, etc. of when the circuit of FIG. 7 operates in a steady-state condition.

Description will be made based on two sections divided according to the level of the input voltage $V_{IN}$ and the voltage of the capacitor 300.

During a section_1 corresponding to a charging section, the capacitor is charged and the LED 200 is driven by the input voltage $V_{IN}$ of the rectifier 100.

During a section_2 corresponding to a discharging section, the LED 200 is driven not by the input voltage $V_{IN}$ but as the capacitor 300 is discharged. Conditions for the sections are as follows.

Section_1: $V_{IN} > V_C + V_{OH}$ (C charging)

Section_2: $V_{IN} < V_C - V_{D1}$ (C discharging)  [Expression 2]

Where, $V_{OH}$ indicates the lowest drain voltage at which the first MOSFET $M_1$ and the second MOSFET $M_2$ operate as current sources, and $V_{D1}$ indicates a turn-on voltage for the first diode 600.

In the section_1, the input voltage $V_{IN}$ is higher than the voltage stored in the capacitor 300, and therefore the current $I_{M1}$ is used to drive the LED 200 at the same time when the capacitor 300 is charged with the current $I_{M2}$.

In the section_2, the input voltage $V_{IN}$ is lower than the voltage of the capacitor 300, and thus the first diode 600 is turned on and the LED 200 is driven by the current $I_{M1}$ based on the voltage of the capacitor 300. Here, for simplicity of description, $V_{OH}$ and $V_{D1}$ are omitted.

To decrease or eliminate the flicker, the lowest voltage level of the capacitor 300 in the section_2 should be higher than the sum of the voltage of the LED 200 and the lowest voltage of the first current driver 400 as follows.

$V_{C,MIN} \geq V_{LED} + V_{OH}$  [Expression 3]

Further, the voltage of the capacitor 300 charged during the section_1 should be equal to the voltage of the capacitor 300 discharged during the section_2 under the steady-state condition, and therefore the following expression should be satisfied. Here, for simplicity of operation description, $V_{OH}$ and voltage drop due to the diode are ignored.

$V_{C,CHARGE} = I_{M2} \times t_1 / C$ $V_{C,DISCHARGE} = I_{M1} \times t_2 / C$ $I_{M2} = I_{M1} \times t_2 / t_1$  [Expression 4]

Where, $t_1$ indicates duration of the section_1, in other words, a charging time, and $t_2$ indicates duration of the section_2, in other words, a discharging time. $V_{C,CHARGE}$ indicates the voltage of the capacitor 300 at the charging, and $V_{C,DISCHARGE}$ indicates the voltage of the capacitor 300 at the discharging.

The higher the voltage of the LED 200 as compared with the input voltage $V_{IN}$, the higher the efficiency. However, the charging time for the capacitor 300 is shortened, and thus $I_{M2}$ higher than $I_{M1}$ is required. Further, the less the capacity of the capacitor 300, the quicker the charging and the discharging. In result, the flicker characteristics may become worse.

Figure 9:
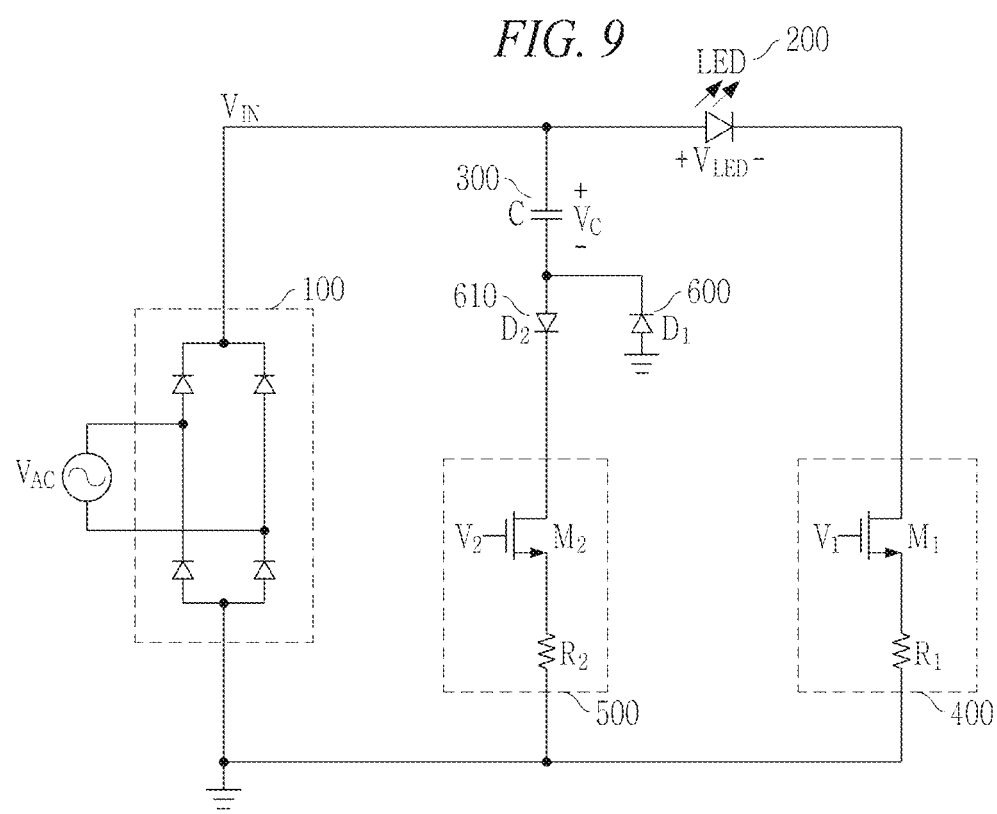
FIG. 9 is a circuit diagram of a driving apparatus with a diode added between the capacitor and a second current driver in FIG. 7.

FIG. 9 is a circuit diagram of a driving apparatus with a diode added between the capacitor and a second current driver in FIG. 7.

As shown therein, the LED driving apparatus may further include a second diode 610 to prevent current from flowing from the second current driver 500 to the capacitor 300.

The second diode 610 may serve to prevent current from flowing due to use of an internal diode formed when an integrated circuit is fabricated or a reverse diode of the second MOSFET $M_2$ when the capacitor 300 is discharged.

Figure 10:
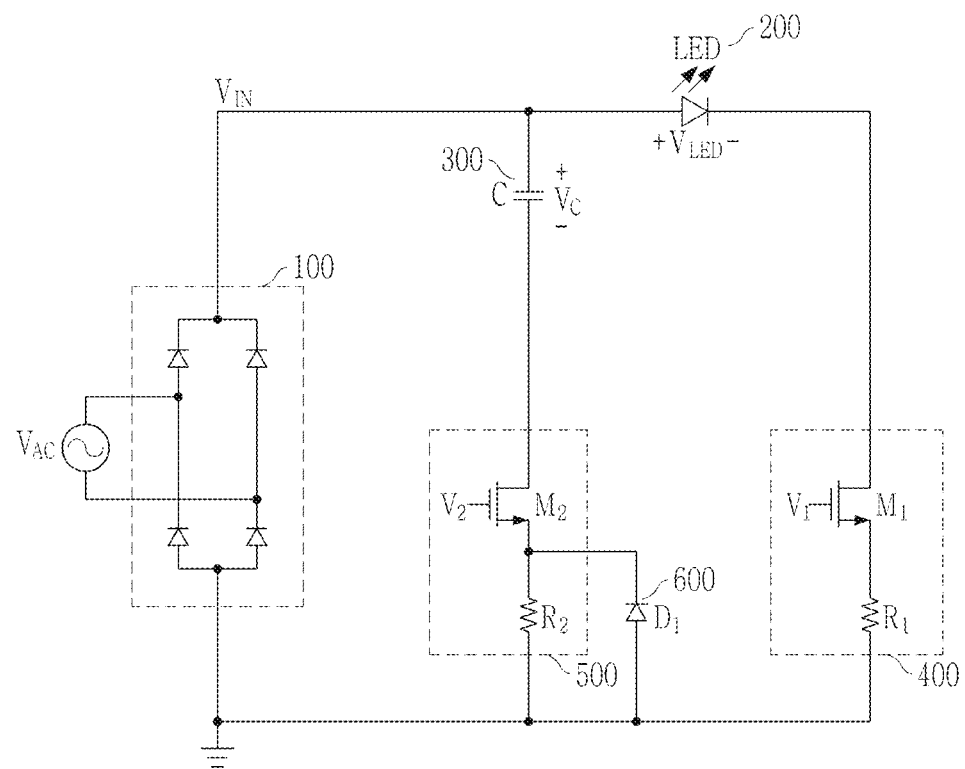
FIG. 10 is a circuit diagram of a driving apparatus in which a first diode is connected in parallel to a second resister in FIG. 7.

FIG. 10 is a circuit diagram of a driving apparatus in which a first diode is connected in parallel to a second resister in FIG. 7.

As shown therein, the first diode 600 may be connected in parallel to the second resister $R_2$, and the other circuits have the same current paths as those of FIG. 7.

Figure 11:
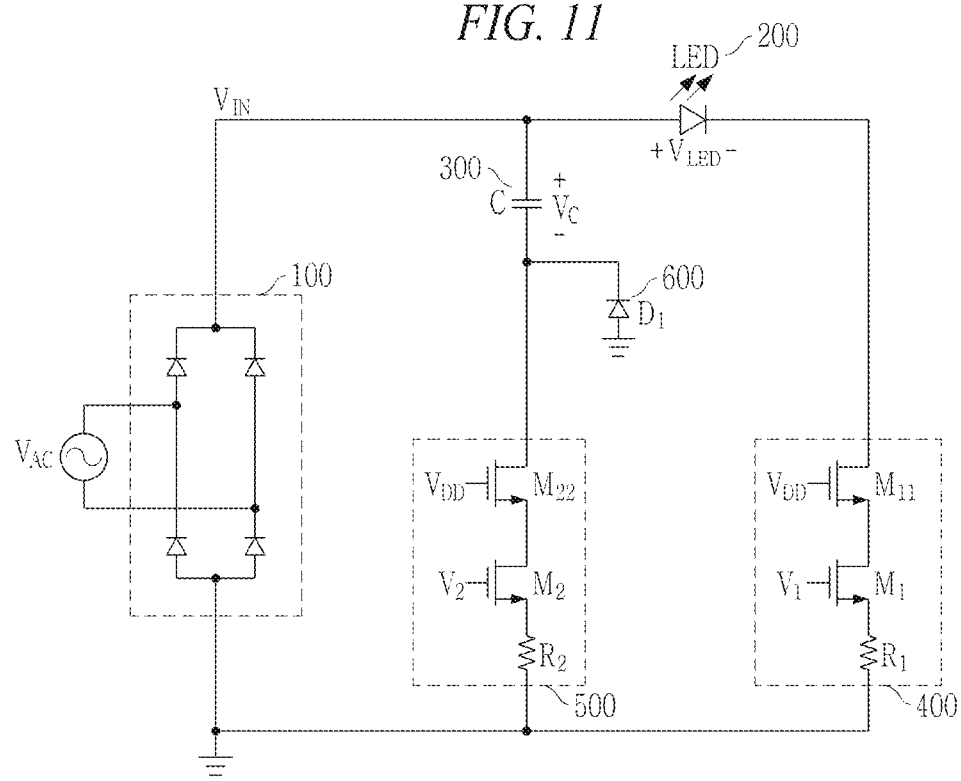
FIG. 11 is a circuit diagram of a driving apparatus in which a first current driver and a second current driver of FIG. 7 are embodied by a cascode circuit.

FIG. 11 is a circuit diagram of a driving apparatus in which a first current driver and a second current driver of FIG. 7 are embodied by a cascode circuit.

According to this embodiment, the first current driver 400 may further include a first cascode device $M_{11}$ connected in series between the LED 200 and the first MOSFET $M_1$, and the second current driver 500 may further include a second cascode device $M_{22}$ connected in series between the capacitor 300 and the second MOSFET $M_2$.

The first cascode device $M_{11}$ and the second cascode device $M_{22}$ may be embodied by MOSFET devices like the first MOSFET M1 and the second MOSFET M2, and a cascode circuit may be used to increase output impedance and thus minimize variation in the driving current due to variation in the drain voltage.

Figure 12:
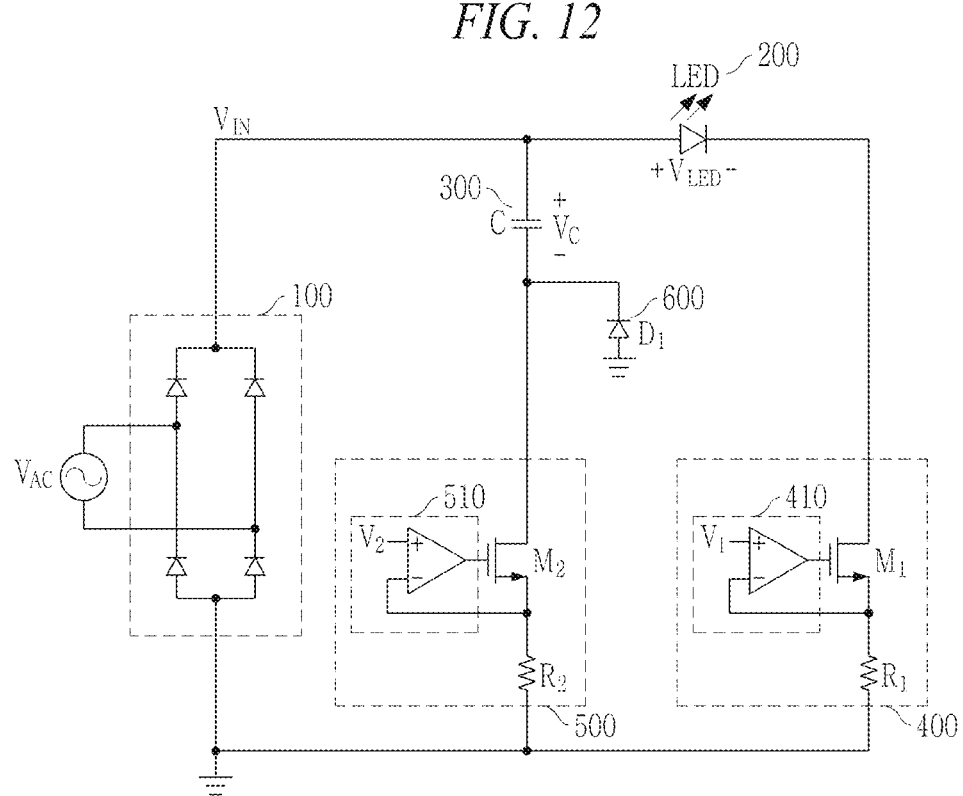
FIG. 12 is a circuit diagram of a driving apparatus with an operational amplifier (OP AMP) added to the first current driver and the second current driver of FIG. 7.

FIG. 12 is a circuit diagram of a driving apparatus with an operational amplifier (OP AMP) added to the first current driver and the second current driver of FIG. 7.

As shown therein, the first current driver 400 may further include a first OP AMP 410 of which an output terminal is connected to a gate terminal of the first MOSFET M1, and the second current driver 500 may further include a second OP AMP 510 of which an output terminal is connected to a gate terminal of the second MOSFET M2.

By applying the OP AMP to the LED driving apparatus, it is possible to improve the characteristics of the first current driver 400 and the second current driver 500. Specifically, the use of the first OP AMP 410 and the second OP AMP 510 not only shortens a cross-time between the current $I_{M1}$ flowing in the first MOSFET $M_1$ and the current $I_{M2}$ flowing in the second MOSFET $M_2$, but also increases the output impedance and removes effects caused by $V_{GS}$ when $I_{M1}$ and $I_{M2}$ are set, thereby minimizing variation in a driving current due to variation in temperature or process parameters.

Figure 13:
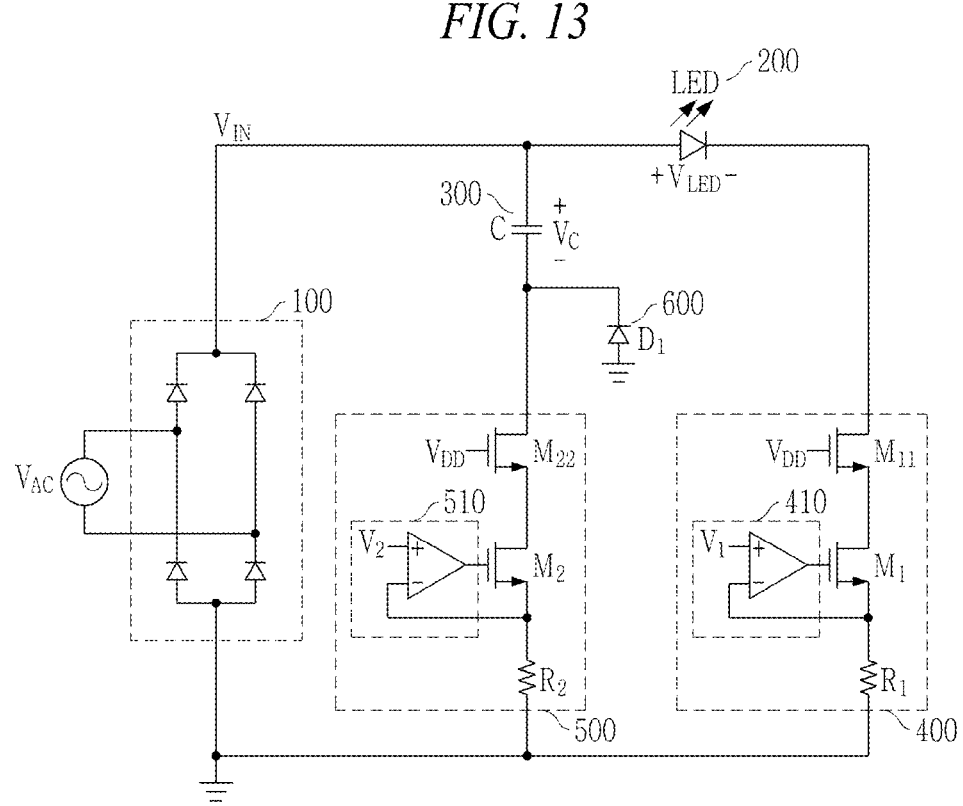
FIG. 13 is a circuit diagram of a driving apparatus with an OP AMP added to the first current driver and the second current driver of FIG. 11.

FIG. 13 is a circuit diagram of a driving apparatus with an OP AMP added to the first current driver and the second current driver of FIG. 11. As shown therein, the first current driver 400 may further include a first cascode device $M_{11}$ connected in series between the LED 200 and the first MOSFET $M_1$ and the first OP AMP 410 of which the output terminal is connected to the gate terminal of the first MOSFET $M_1$, and the second current driver 500 may further include a second cascode device $M_{22}$ connected in series between the capacitor 300 and the second MOSFET $M_2$ and the second OP AMP 510 of which the output terminal is connected to the gate terminal of the second MOSFET M2.

Figure 14:
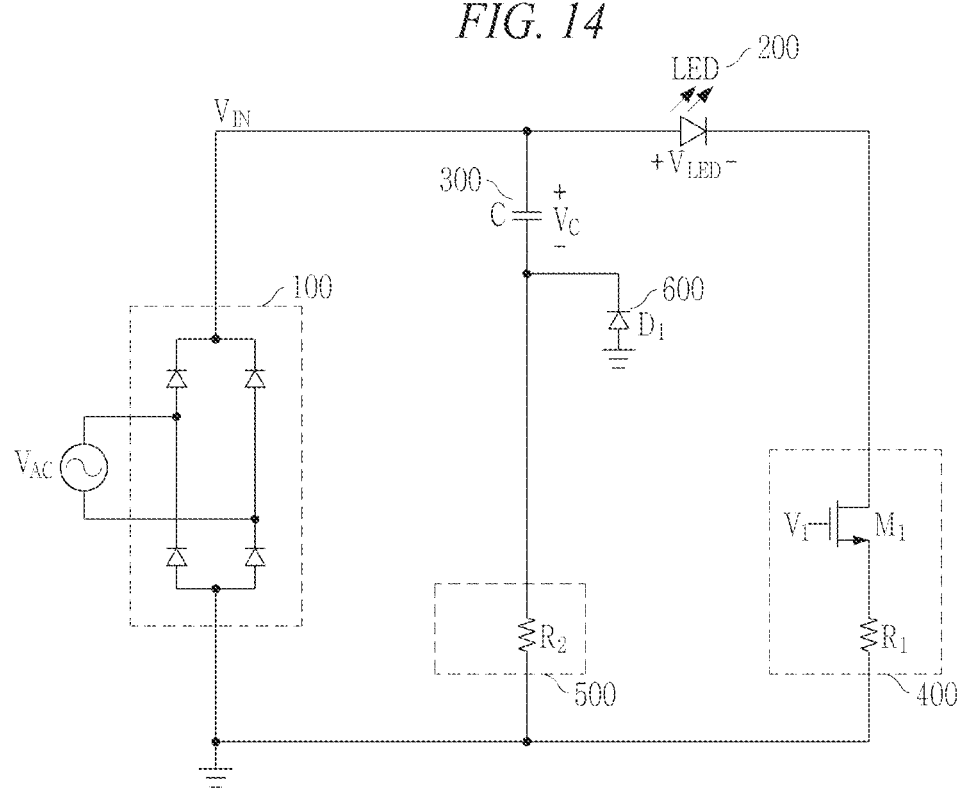
FIG. 14 is a circuit diagram of a driving apparatus in which the second current driver of FIG. 7 is embodied by a resister.

FIG. 14 is a circuit diagram of a driving apparatus in which the second current driver of FIG. 7 is embodied by a resister.

The LED driving apparatus according to this exemplary embodiment includes the second resister $R_2$ connected between the capacitor 300 and the ground terminal, as the second current driver 500. In other words, the second current driver 500 may be embodied with only the second resister R2 without the second MOSFET $M_2$ of FIG. 7.

Figure 15:
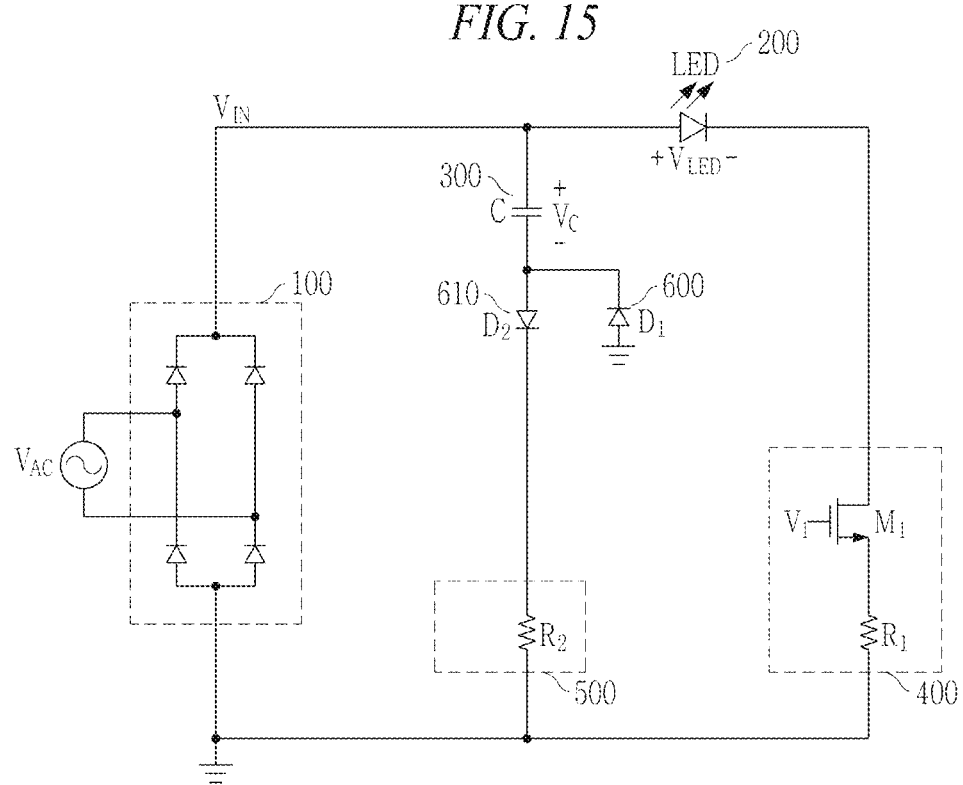
FIG. 15 is a circuit diagram of a driving apparatus with a diode added between the capacitor and the second current driver of FIG. 14.

FIG. 15 is a circuit diagram of a driving apparatus with a diode added between the capacitor and the second current driver of FIG. 14.

The second current driver 500, which uses only the second current driver 500 of FIG. 14, in other words, the second resister $R_2$ to control the charging and discharging of the capacitor 300, may further include the second diode 610 for preventing current from flowing to the capacitor 300 as shown in FIG. 15.

Figure 16:
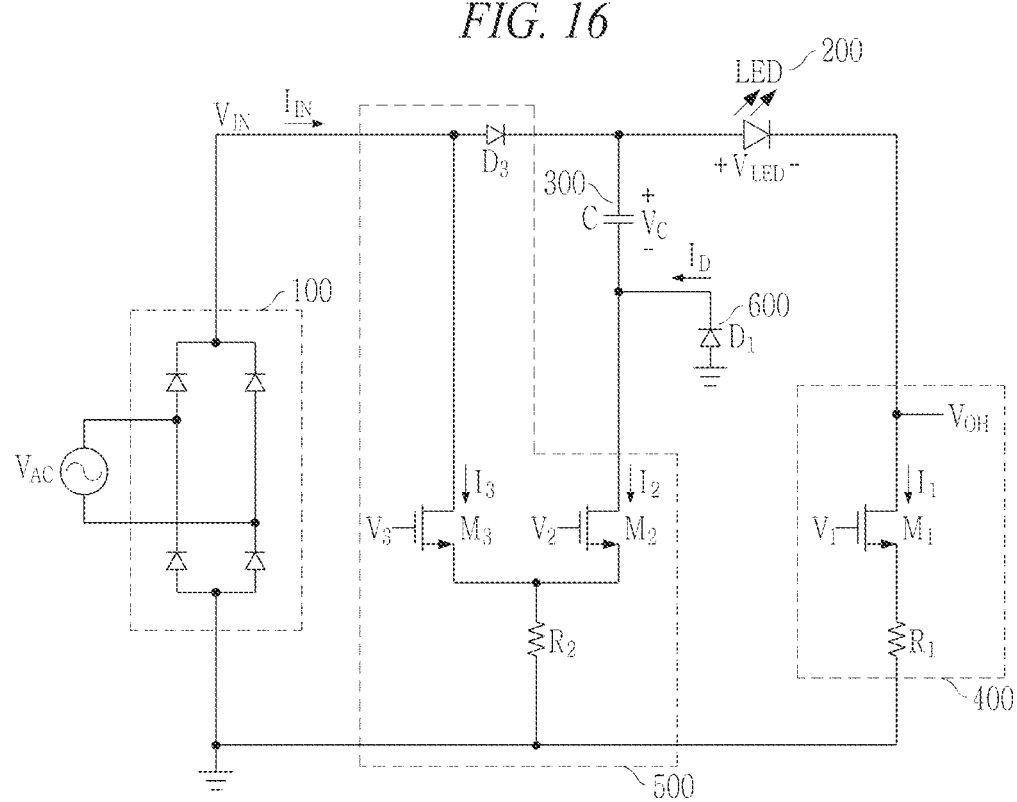
FIG. 16 is a circuit diagram of an AC direct LED driving apparatus including an LED driving capacitor according to another exemplary embodiment.

FIG. 16 is a circuit diagram of an AC direct LED driving apparatus including an LED driving capacitor according to another exemplary embodiment.

As shown therein, the LED driving apparatus according to this exemplary embodiment includes the first current driver 400, which includes the first MOSFET $M_1$ and the first resister $R_1$, as shown in FIG. 7.

Meanwhile, the second current driver 500 includes a third diode $D_3$ which has an anode connected to the rectifier 100 and a cathode connected to the first terminal of the LED 200, the second MOSFET $M_2$ which has the drain terminal connected to the capacitor 300, the third MOSFET $M_3$ which has the drain terminal connected to the anode of the third diode $D_3$ and is source-coupled to the second MOSFET $M_2$, and the second resister $R_2$ connected between the ground terminal and the source terminals of the second MOSFET $M_2$ and the third MOSFET $M_3$.

As compared with the LED driving apparatus of FIG. 7, the second current driver 500 in the LED driving apparatus of FIG. 16 includes the switching devices of two MOSFETs $M_1$ and $M_2$, so that the two MOSFETs $M_1$ and $M_2$ can sequentially drive the capacitor 300. The second MOSFET $M_2$ and the third MOSFET $M_3$ form a source-couple circuit, so that the third MOSFET $M_3$ can be turned off while current for charging the capacitor 300 flows as the second MOSFET $M_2$ is turned on, and the third MOSFET $M_3$ can be turned on to thereby form a current path while the capacitor 300 is discharged as the second MOSFET $M_2$ is turned off Further, the second current driver 500 according to this exemplary embodiment further includes the third diode $D_3$ on the current path of the rectifier 100 and the LED 200, and the third diode $D_3$ allows the current to flow through not the capacitor 300 but the rectifier 100 through the third MOSFET $M_3$ while the capacitor 300 is discharged. In this case, the current flowing in the first MOSFET $M_1$, the second MOSFET $M_2$ and the third MOSFET $M_3$ is as follows.

$I_{M1}=(V_1-V_{GS,M1})/R_1$ $I_{M2}=(V_2-V_{GS,M2})/R_2$ $I_{M3}=(V_3-V_{GS,M3})/R_3$ [Expression 5]

Where, $V_2$ is higher than $V_3$ ($V_2>V_3$), and the current flowing in the third MOSFET $M_3$ is not involved in driving the LED 200 but serves to improve the power factor by allowing the input current to flow during the discharging section of the capacitor 300 or supply current for driving a triode AC switch (TRIAC).

Figure 17:
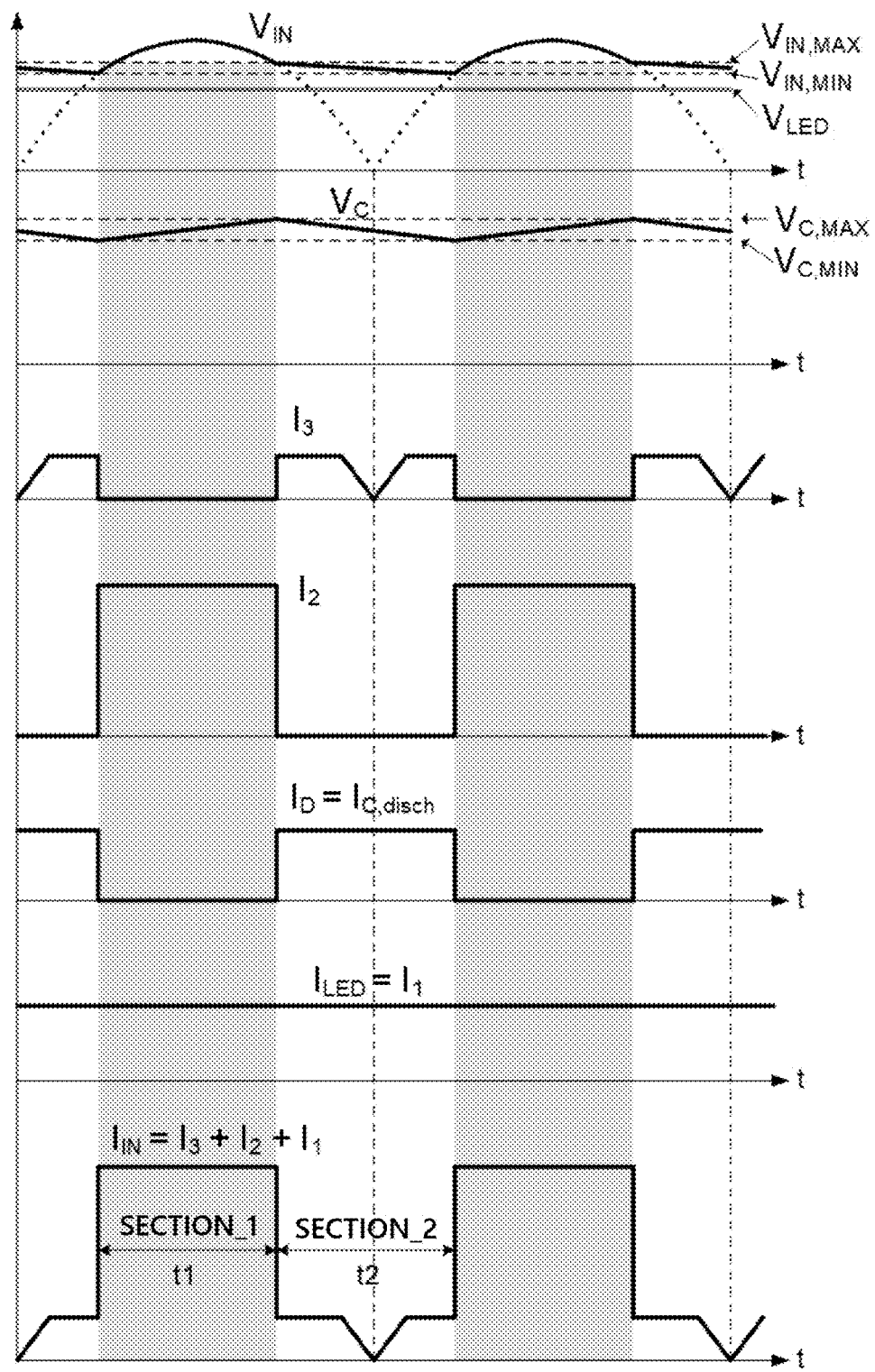
FIG. 17 is a graph showing current flowing in important devices and voltage at important nodes in the circuit of FIG. 7.

FIG. 17 is a graph showing current flowing in important devices and voltage at important nodes in the circuit of FIG. 7. As compared with FIG. 8, FIG. 17 additionally includes a graph of current $I_3$ flowing in the third MOSFET $M_3$.

As described above, the second MOSFET $M_2$ and the third MOSFET $M_3$ exhibit the characteristics of the sequential driver as a source-couple circuit in which the source terminals thereof are connected to each other. In other words, a section in which the current $I_3$ flows in the third MOSFET $M_3$ corresponds to a section $t_2$ in which no current flows in the second MOSFET $M_2$ and the capacitor 300 is discharged.

Figure 6:
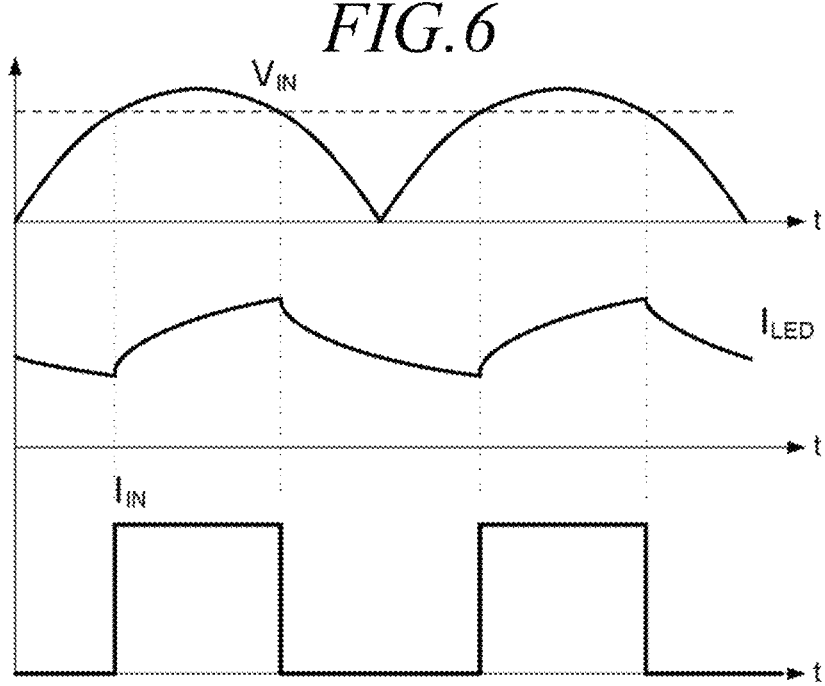
FIG. 6 is a graph showing input voltage, input current and LED current in the circuit of FIG. 5.
Figure 18:
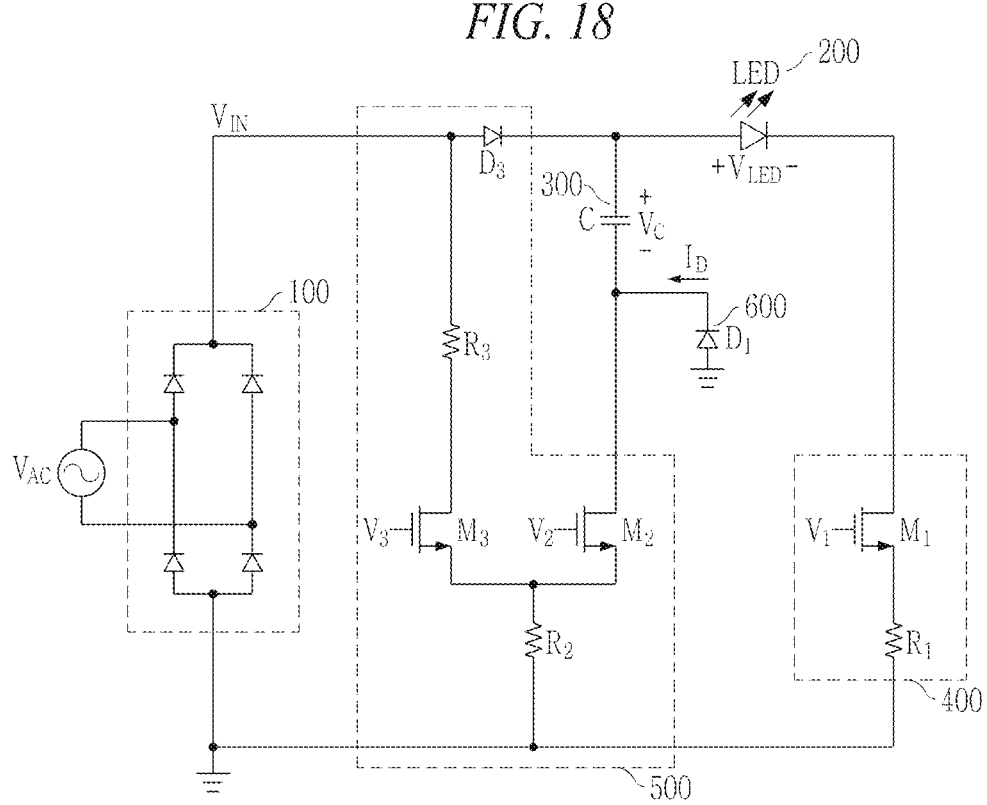
FIG. 18 is a circuit diagram of a driving apparatus with a resister added between a third diode and a third metal oxide semiconductor field effect transistor (MOSFET) in FIG. 6.

FIG. 18 is a circuit diagram of a driving apparatus with a resister added between a third diode and a third MOSFET in FIG. 6.

As shown therein, the second current driver 500 further includes a third resister $R_3$ connected between the anode of the third diode $D_3$ and the drain terminal of the third MOSFET $M_3$, thereby making the current flowing in the third MOSFET $M_3$ be proportional to the level of the input voltage. In other words, the third resister $R_3$ makes the current of the third MOSFET $M_3$ sequentially driving the capacitor 300 increase in proportion to the level of the input voltage.

Figure 19:
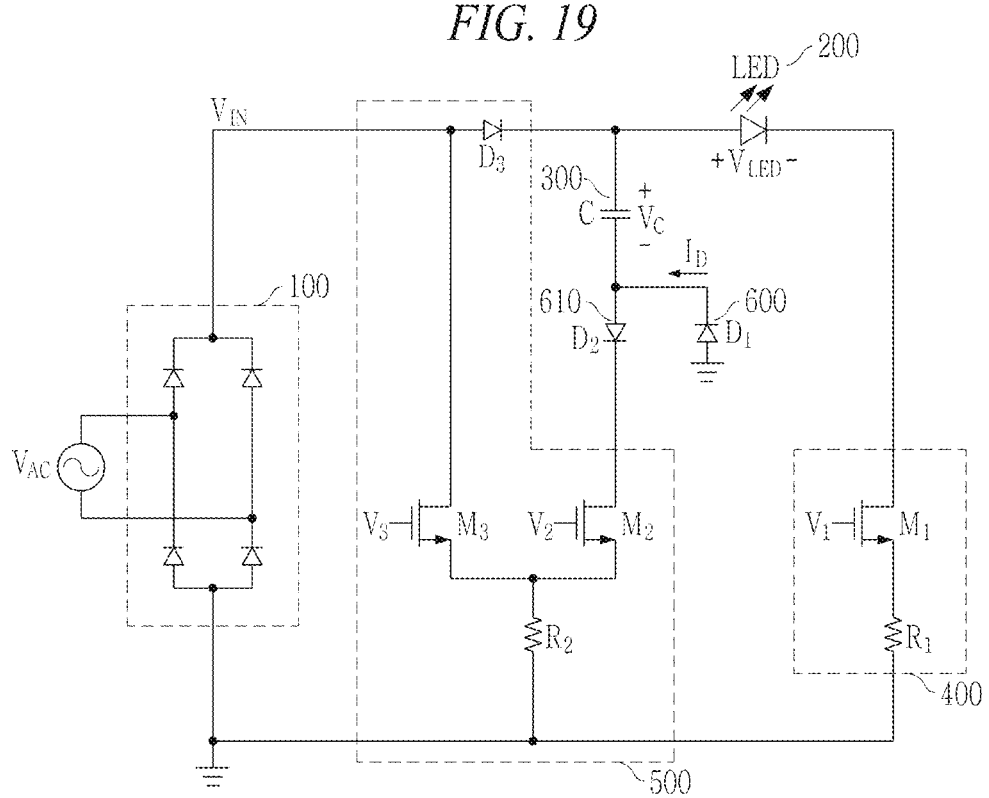
FIG. 19 is a circuit diagram of a driving apparatus with a diode added between the capacitor and a second current driver in FIG. 16.

FIG. 19 is a circuit diagram of a driving apparatus with a diode added between the capacitor and a second current driver in FIG. 16.

As shown therein, the LED driving apparatus may further include the second diode 610 to prevent current from flowing from the second current driver 500 to the capacitor 300.

The second diode 610 may serve to prevent current from flowing due to use of an internal diode formed when an integrated circuit is fabricated or a reverse diode of the second MOSFET $M_2$ when the capacitor 300 is discharged.

Figure 20:
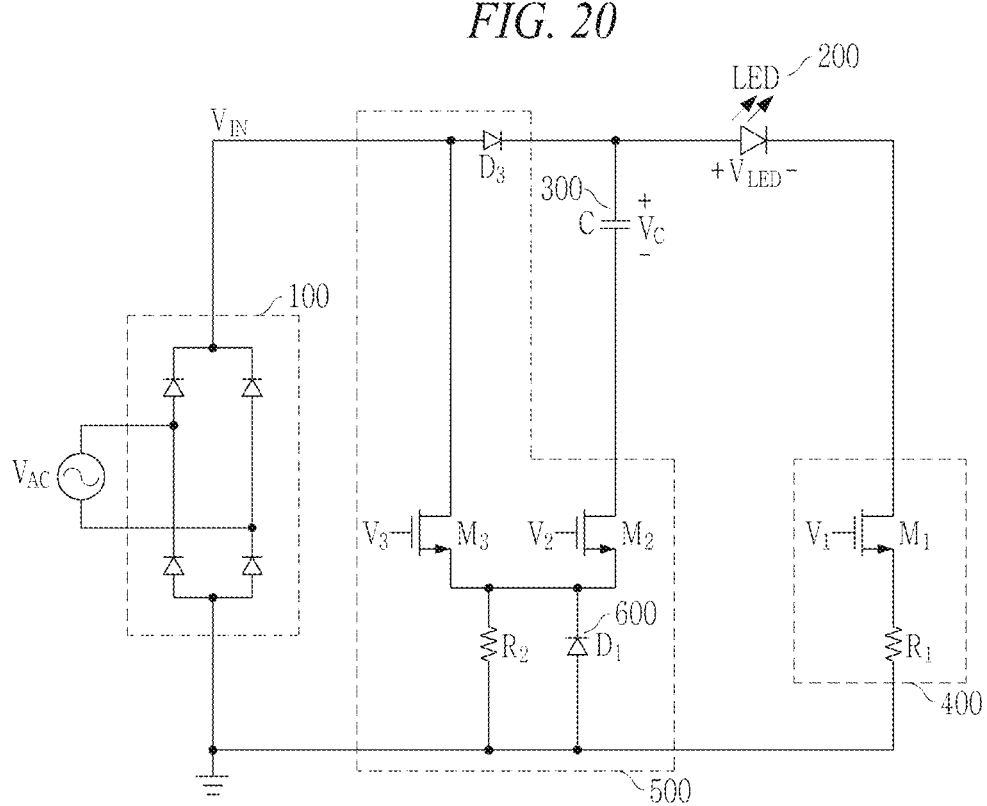
FIG. 20 is a circuit diagram of a driving apparatus in which a first diode is connected in parallel to a second resister in FIG. 16.

FIG. 20 is a circuit diagram of a driving apparatus in which a first diode is connected in parallel to a second resister in FIG. 16.

As shown therein, the first diode 600 may be connected in parallel to the second resister $R_2$, and the other circuits have the same current paths as those of FIG. 16.

Figure 21:
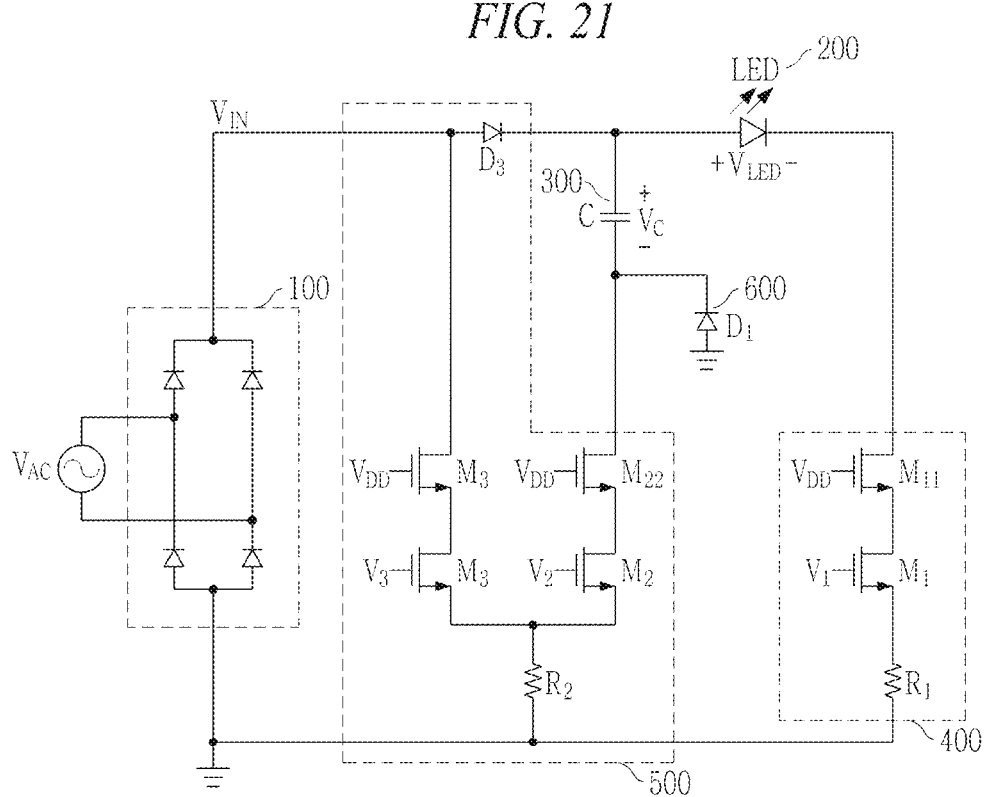
FIG. 21 is a circuit diagram of a driving apparatus in which a first current driver and a second current driver are embodied by a cascode circuit in FIG. 16.

FIG. 21 is a circuit diagram of a driving apparatus in which a first current driver and a second current driver are embodied by a cascode circuit in FIG. 16.

According to this embodiment, the first current driver 400 may further include a first cascode device $M_{11}$ connected in series between the LED 200 and the first MOSFET $M_1$, and the second current driver 500 may further include a second cascode device $M_{22}$ connected in series between the capacitor 300 and the second MOSFET $M_2$ and a the third cascode device $M_{33}$ connected in series between the anode of the third diode $D_3$ and the third MOSFET $M_3$.

The first cascode device $M_{11}$, the second cascode device $M_{22}$ and the third MOSFET $M_3$ may be embodied by MOSFET devices like the first MOSFET $M_1$, the second MOSFET $M_2$ and the third MOSFET $M_3$, and a cascode circuit may be used to increase output impedance and thus minimize variation in the driving current due to variation in the drain voltage.

Figure 22:
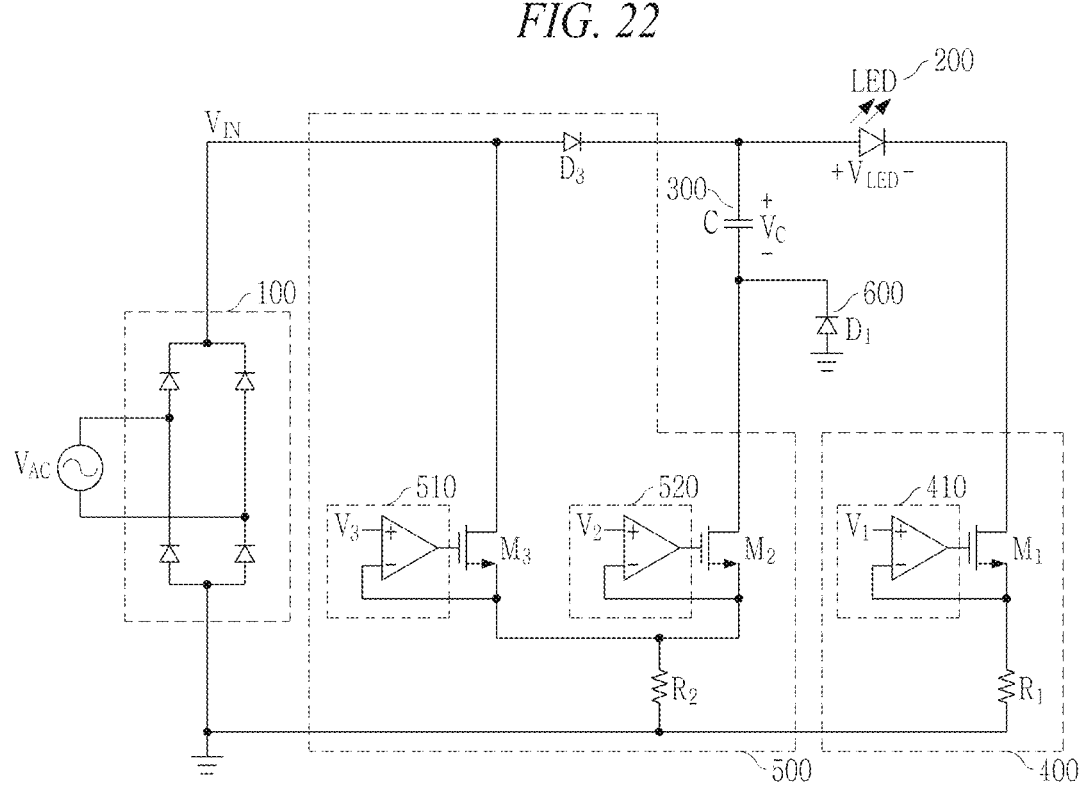
FIG. 22 is a circuit diagram of a driving apparatus with an OP AMP added to the first current driver and the second current driver in FIG. 16.

FIG. 22 is a circuit diagram of a driving apparatus with an OP AMP added to the first current driver and the second current driver in FIG. 16.

According to this embodiment, the first current driver 400 may further include a first OP AMP 410 of which the output terminal is connected to a gate terminal of the first MOSFET $M_1$, and the second current driver 500 may further include a second OP AMP 510 of which an output terminal is connected to a gate terminal of the second MOSFET $M_2$ and a third OP AMP 520 of which an output terminal is connected to a gate terminal of the third MOSFET $M_3$.

By applying the OP AMP to the LED driving apparatus, it is possible to improve the characteristics of the first current driver 400 and the second current driver 500. Specifically, the use of the first OP AMP 410, the second OP AMP 510 and the third OP AMP 520 not only shortens a cross-time between the current $I_{M1}$ flowing in the first MOSFET $M_1$ and the current $I_{M2}$ flowing in the second MOSFET $M_2$ and a cross-time between the current $I_{M1}$ flowing in the first MOSFET $M_1$ and the current $I_{M3}$ flowing in the third MOSFET $M_3$, but also increases the output impedance and removes effects caused by $V_{GS}$ when $I_{M1}$, $I_{M2}$ and $I_{M3}$ are set, thereby minimizing variation in a driving current due to variation in temperature or process parameters.

Figure 23:
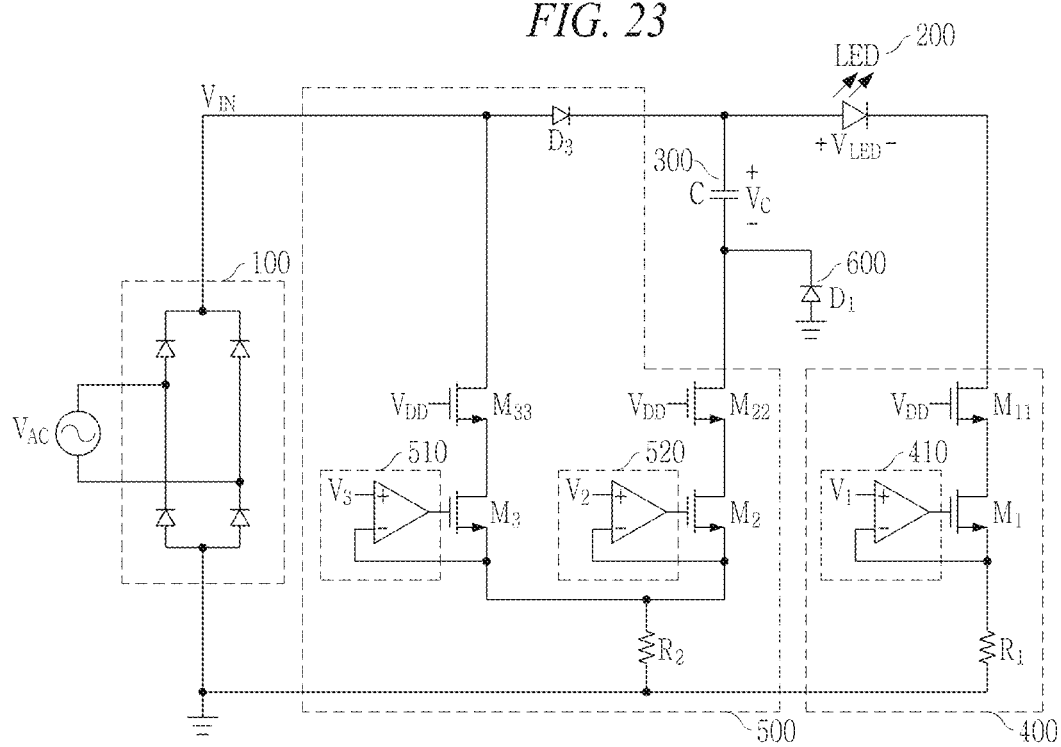
FIG. 23 is a circuit diagram of a driving apparatus with an OP AMP added to the first current driver and the second current driver of FIG. 22.

FIG. 23 is a circuit diagram of a driving apparatus with an OP AMP added to the first current driver and the second current driver of FIG. 22.

Figure 24:
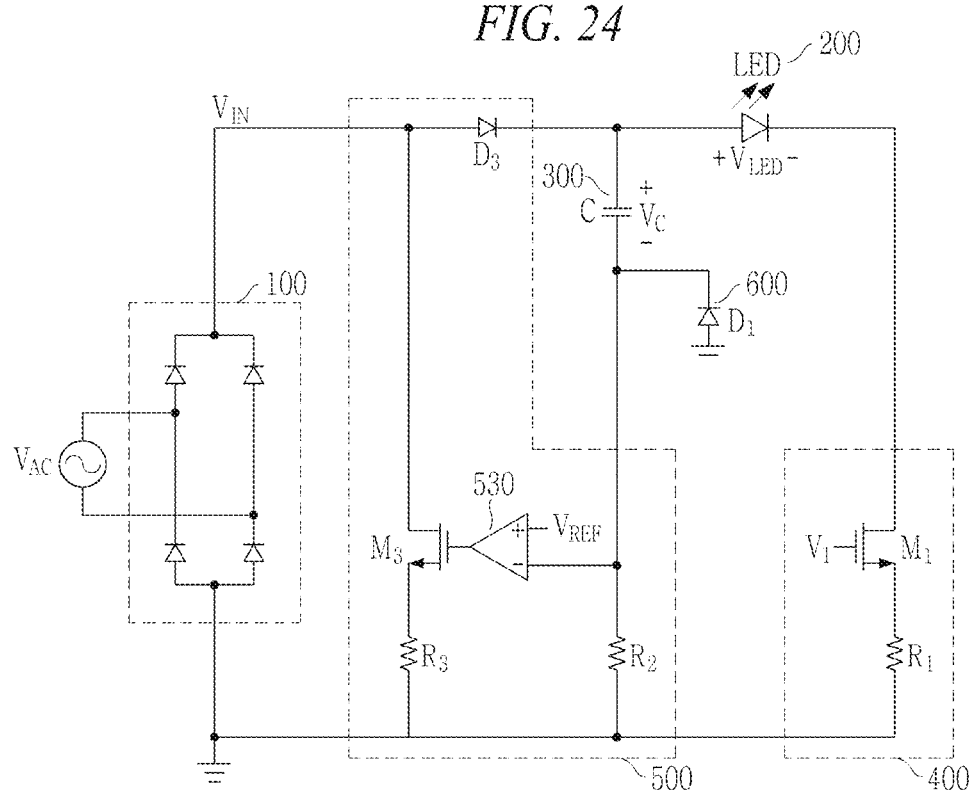
FIG. 24 is a circuit diagram of an AC direct LED driving apparatus including an LED driving capacitor according to still another exemplary embodiment, in which a second current driver includes a comparator for detecting voltage of a second resister.

FIG. 23 shows that the OP AMP is added to the cascode-type current driver. As shown therein, the first current driver 400 may further include a a first cascode device $M_{11}$ connected in series between the LED 200 and the first MOSFET $M_1$, and a first OP AMP 410 of which an output terminal is connected to the gate terminal of the first MOSFET $M_1$, and the second current driver 500 may further include a second cascode device $M_{22}$ connected in series between the capacitor 300 and the second MOSFET $M_2$, and a second OP AMP 510 of which an output terminal is connected to the gate terminal of the second MOSFET $M_2$. In addition, the second current driver 500 may further include a third cascode device $M_{33}$ connected in series between the anode of the third diode $D_3$ and the third MOSFET $M_3$, and a third OP AMP 520 of which an output terminal is connected to the gate terminal of the third MOSFET $M_3$, FIG. 24 is a circuit diagram of an AC direct LED driving apparatus including an LED driving capacitor according to still another exemplary embodiment, in which a second current driver includes a comparator for detecting voltage of a second resister.

A first current driver 400 of the LED driving apparatus according to this exemplary embodiment includes a first MOSFET $M_1$ of which a drain terminal is connected to the second terminal of the LED 200, and a first resister $R_1$ connected between the source terminal of the first MOSFET $M_1$ and the ground terminal, like those shown in FIG. 7.

Meanwhile, a second current driver 500 may include a comparator 530 comparing a predetermined voltage and voltage at opposite ends of a second resister $R_2$ and controlling the third MOSFET $M_3$ to be turned on or off, in addition to a third diode $D_3$ of which an anode is connected to the rectifier 100 and a cathode is connected to the first terminal of the LED 200, the second resister $R_2$ connected between the capacitor 300 and the ground terminal, a third MOSFET $M_3$ of which a drain terminal is connected to the anode of the third diode $D_3$, and a third resister $R_3$ connected between the source terminal of the third MOSFET $M_3$ and the ground terminal.

Here, the predetermined voltage refers to a reference voltage of the comparator 530, and the comparator 530 may detect the voltage of the second resister $R_2$ based on comparison with the reference voltage. The comparator 530 may be replaced by an inductor, a common emitter or the like capable of detecting the voltage of the second resister $R_2$.

Figure 25:
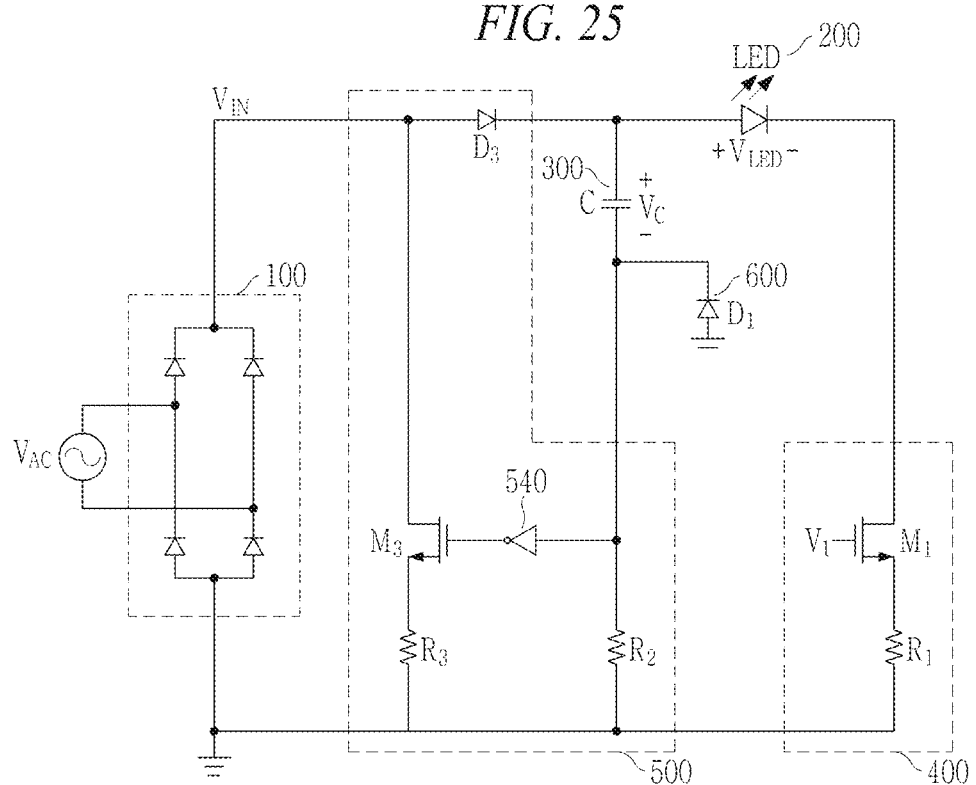
FIG. 25 is a circuit diagram of an AC direct LED driving apparatus including an LED driving capacitor according to yet another exemplary embodiment, in which a second current driver includes an inverter for detecting voltage of a second resister.

FIG. 25 is a circuit diagram of an AC direct LED driving apparatus including an LED driving capacitor according to yet another exemplary embodiment, in which a second current driver includes an inverter for detecting voltage of a second resister.

In the LED driving apparatus according to this exemplary embodiment, the first current driver 400 includes a first MOSFET $M_1$ of which a drain terminal is connected to the second terminal of the LED 200, and a first resister $R_1$ connected between the source terminal of the first MOSFET $M_1$ and the ground terminal, like those shown in FIG. 7.

Meanwhile, the second current driver 500 may include an inverter 540 detecting voltage at opposite ends of a second resister $R_2$ and controlling the third MOSFET $M_3$ to be turned on or off, in addition to a third diode $D_3$ of which an anode is connected to the rectifier 100 and a cathode is connected to the first terminal of the LED 200, the second resister $R_2$ connected between the capacitor 300 and the ground terminal, a third MOSFET $M_3$ of which a drain terminal is connected to the anode of the third diode $D_3$, and a third resistor $R_3$ connected between the source terminal of the third MOSFET $M_3$ and the ground terminal.

Here, the inverter 540 may be replaced by a common source circuit capable of detecting the voltage of the second resister $R_2$.

Thus, the exemplary embodiments provide an AC-direct LED driving circuit which does not need an electromagnetic interference (EMI) filter unlike a converter type using an inductor or a transformer because a high-frequency switching operation is not performed, not only very simplifies the whole system but also reduces production costs, and exhibits characteristics of a low percentage flicker.

According to an exemplary embodiment, there is provided an AC-direct LED driving apparatus including an LED driving capacitor improved in flicker characteristics.

According to an exemplary embodiment, there is provided an AC-direct LED driving apparatus including an LED driving capacitor, which satisfies high efficiency and high power-factor characteristics and decreases an over-charged current.

According to an exemplary embodiment, there is provided an AC-direct LED driving apparatus which satisfies a low THD characteristic while satisfying a uniform optical characteristic and a high optical efficiency.

Meanwhile, exemplary embodiments may be realized by not only the apparatus and/or method described above, but also a program for implementing functions corresponding the features of the exemplary embodiments or a recording medium in which the program is recorded, and such realization is easily conceivable from the foregoing description of the exemplary embodiment by a person having an ordinary skill in the art to which the disclosure pertains.

Although a few exemplary embodiments have been described in detail, the scope of the disclosure is not limited to these exemplary embodiments but covers all changes and modifications made by those skilled in the art within the fundamental concept as defined the appended claims.

What is claimed is:

1. A light emitting diode (LED) driving apparatus comprising:
 a rectifier configured to receive and rectify an alternating current (AC) voltage;
 an LED configured to emit light based on a rectified voltage received from the rectifier;
 a capacitor connected to a first terminal of the LED, and configured to drive the LED while alternating between charging and discharging sections according to a preset cycle;
 a first current driver connected to a second terminal of the LED and configured to control a path of current flowing in the LED and the capacitor based on different input voltage levels;
 a second current driver configured to control charging and discharging of the capacitor; and a first diode connected onto a current path of the capacitor and the second current driver, and configured to form a discharging path for driving the LED based on a charged voltage of the capacitor, wherein the first diode provides a discharging path of the capacitor, is turned on when the input voltage is lower than voltage stored in the capacitor, and provides a current path for allowing the first current driver to drive the LED.

2. The LED driving apparatus according to claim 1, wherein
the first current driver comprises:
a first metal oxide semiconductor field effect transistor (MOSFET) of which a drain terminal is connected to the second terminal of the LED; and
a first resister connected between a source terminal of the first MOSFET and a ground terminal, and
the second current driver comprises:
a second MOSFET of which a drain terminal is connected to the capacitor; and
a second resister connected between a source terminal of the second MOSFET and the ground terminal.

3. The LED driving apparatus according to claim 2, further comprising a second diode configured to prevent current from flowing from the second current driver to the capacitor.

4. The LED driving apparatus according to claim 2, wherein the first diode is connected in parallel to the second resister.

5. The LED driving apparatus according to claim 2, wherein
the first current driver further comprises a first cascode device connected in series between the LED and the first MOSFET, and
the second current driver further comprises a second cascode device connected in series between the capacitor and the second MOSFET.

6. The LED driving apparatus according to claim 5, wherein
the first current driver further comprises a first operational amplifier (OP AMP) of which an output terminal is connected to a gate terminal of the first MOSFET, and
the second current driver further comprises a second OP AMP of which an output terminal is connected to a gate terminal of the second MOSFET.

7. The LED driving apparatus according to claim 2, wherein
the first current driver further comprises a first operational amplifier (OP AMP) of which an output terminal is connected to a gate terminal of the first MOSFET, and
the second current driver further comprises a second OP AMP of which an output terminal is connected to a gate terminal of the second MOSFET.

8. The LED driving apparatus according to claim 1, wherein
the first current driver comprises:
a first MOSFET of which a drain terminal is connected to the second terminal of the LED; and
a first resister connected between a source terminal of the first MOSFET and a ground terminal, and
the second current driver comprises:
a second resister connected between the capacitor and the ground terminal.

9. The LED driving apparatus according to claim 8, further comprising a second diode configured to prevent current from flowing from the second current driver to the capacitor.

10. The LED driving apparatus according to claim 8, wherein the first diode is connected in parallel to the second resister.

11. The LED driving apparatus according to claim 1, wherein
the first current driver comprises:
a first MOSFET of which a drain terminal is connected to the second terminal of the LED; and
a first resistor connected between a source terminal of the first MOSFET and a ground terminal, and
the second current driver comprises:
a third diode of which an anode is connected to the rectifier and a cathode is connected to the first terminal of the LED;
a second MOSFET of which a drain terminal is connected to the capacitor;
a third MOSFET of which a drain terminal is connected to the anode of the third diode and which is source-coupled to the second MOSFET; and
a second resister connected between a source terminal of the second MOSFET and the ground terminal.

12. The LED driving apparatus according to claim 11, wherein
the second current driver further comprises a third resister connected between the anode of the third diode and the drain terminal of the third MOSFET, and making current flowing in the third MOSFET be proportional to a level of an input voltage.

13. The LED driving apparatus according to claim 11, further comprising a second diode configured to prevent current from flowing from the second current driver to the capacitor.

14. The LED driving apparatus according to claim 11, wherein the first diode is connected in parallel to the second resister.

15. The LED driving apparatus according to claim 11, wherein
the first current driver further comprises a first cascode device connected in series between the LED and the first MOSFET, and
the second current driver further comprises:
a second cascode device connected in series between the capacitor and the second MOSFET; and
a third cascode device connected in series between the anode of the third diode and the third MOSFET.

16. The LED driving apparatus according to claim 15, wherein
the first current driver further comprises a first OP AMP of which an output terminal is connected to the gate terminal of the first MOSFET, and
the second current driver further comprises:
a second OP AMP of which an output terminal is connected to the gate terminal of the second MOSFET; and
a third OP AMP of which an output terminal is connected to the gate terminal of the third MOSFET.

17. The LED driving apparatus according to claim 11, wherein
the first current driver further comprises a first OP AMP of which an output terminal is connected to the gate terminal of the first MOSFET, and
the second current driver further comprises:
a second OP AMP of which an output terminal is connected to the gate terminal of the second MOSFET; and
a third OP AMP of which an output terminal is connected to the gate terminal of the third MOSFET.

18. The LED driving apparatus according to claim 1, wherein
the first current driver comprises:
a first MOSFET of which a drain terminal is connected to the second terminal of the LED; and
a first resister connected between the source terminal of the first MOSFET and a ground terminal, and
the second current driver comprises:
a third diode of which an anode is connected to the rectifier and a cathode is connected to the first terminal of the LED;
a second resister connected between the capacitor and the ground terminal;
a third MOSFET of which a drain terminal is connected to the anode of the third diode;
a third resister connected between the source terminal of the third MOSFET and the ground terminal; and
a comparator configured to compare a predetermined voltage with voltage at opposite terminals of the second resister and control the third MOSFET to be turned on or off.

19. The LED driving apparatus according to claim 1, wherein
the first current driver comprises:
a first MOSFET of which a drain terminal is connected to the second terminal of the LED; and
a first resister connected between the source terminal of the first MOSFET and a ground terminal, and
the second current driver comprises:
a third diode of which an anode is connected to the rectifier and a cathode is connected to the first terminal of the LED;
a second resister connected between the capacitor and the ground terminal;
a third MOSFET of which a drain terminal is connected to the anode of the third diode;
a third resister connected between the source terminal of the third MOSFET and the ground terminal; and
an inverter configured to detect voltage at opposite terminals of the second resister and control the third MOSFET to be turned on or off.

\* \* \* \* \*